March 5, 1929.  F. P. BECKER  1,704,527
HYDRAULIC SHOCK ABSORBER
Filed Aug. 20, 1927
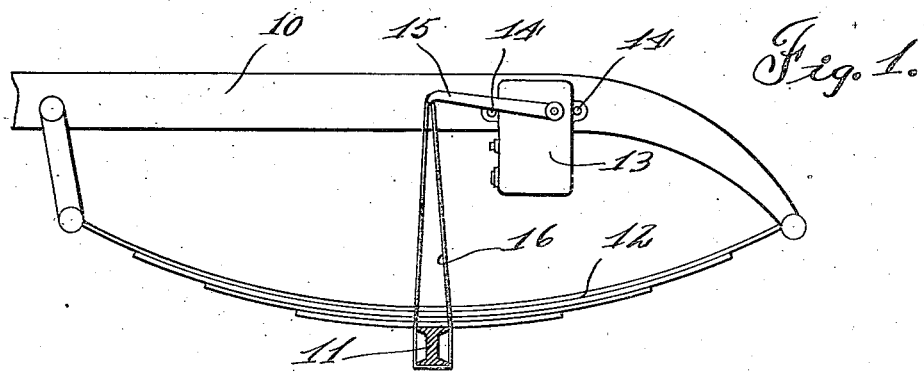
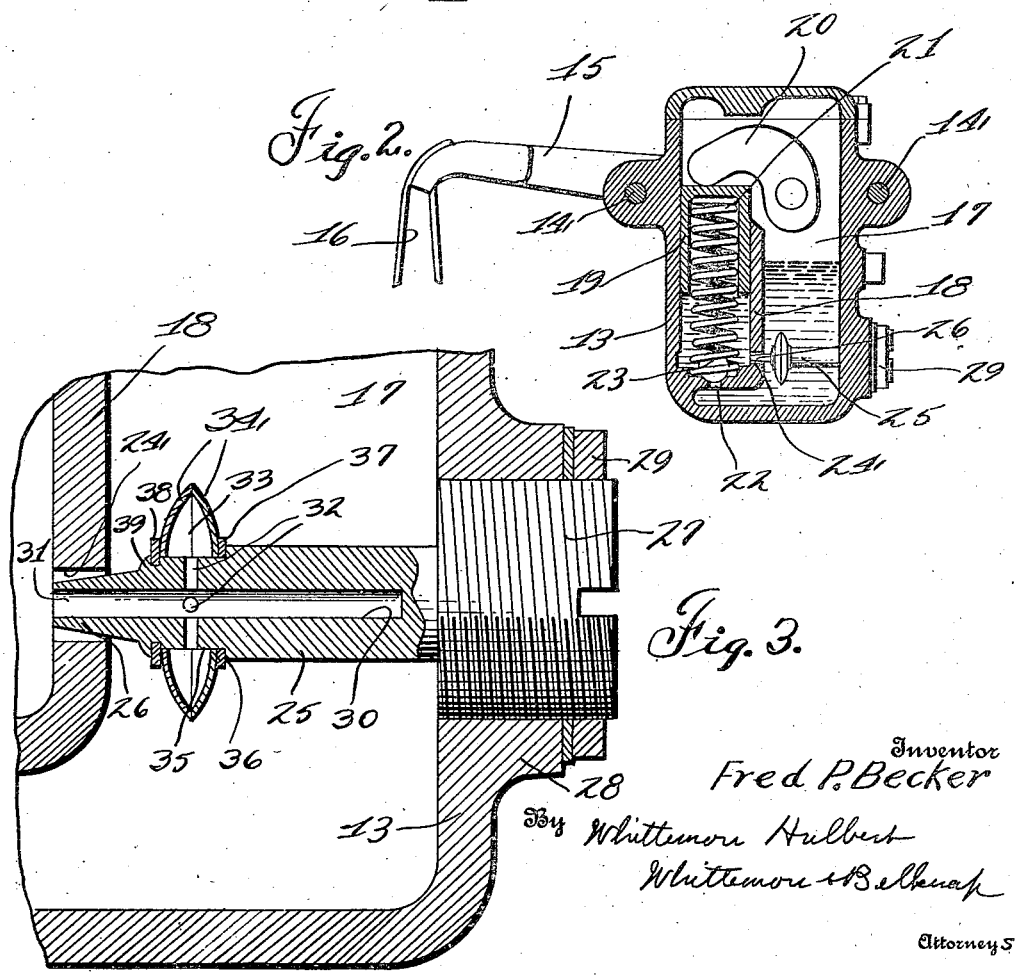
Inventor
Fred P. Becker
By Whittemore Hulbert
Whittemore & Belknap
Attorneys Patented Mar. 5, 1929.

1,704,527

UNITED STATES PATENT OFFICE.

FRED P. BECKER, OF MONROE, MICHIGAN, ASSIGNOR TO MONROE AUTO EQUIPMENT MANUFACTURING COMPANY, OF MONROE, MICHIGAN, A CORPORATION OF MICHIGAN.

HYDRAULIC SHOCK ABSORBER.

Application filed August 20, 1927. Serial No. 214,428.

This invention relates to shock absorbers and more particularly to hydraulic shock absorbers for cushioning the movement of two relatively movable members; devices of this character finding particular utility in connection with automobiles and other vehicles.

Devices of this character consist essentially of a casing adapted to be secured to one of the movable members and presenting a fluid chamber and a cylinder, a piston being reciprocable in said cylinder and being connected to the other relatively movable member. Fluid is introduced into the casing and means is provided for establishing a free flow of this fluid from the chamber to the cylinder in response to the movement of the piston in one direction while the movement of the piston in the other direction, that is the working stroke of the piston, is retarded or impeded by controlling the flow of the fluid from the cylinder to the chamber whereby the shock of sudden movement between the relatively movable members is dissipated. My invention relates particularly to improvements in the means for controlling the flow of fluid from the cylinder to the fluid chamber and has as its objects to simplify, render more efficient and improve this structure generally.

In accordance with my invention I propose the use of a manually regulatable set valve such as a needle valve cooperating with an aperture in the wall of the cylinder whereby the normal flow of the fluid from the cylinder to the chamber is restricted. I also propose modifying this needle valve by the addition of a pressure controlled auxiliary port adapted, upon the attainment of excess pressure resulting from sudden shocks, to open to permit a less restricted flow of fluid from the cylinder to the fluid chamber. As a consequence of this construction the downward movement of this piston is regulated and controlled under all conditions and the shock of sudden movement between the relatively movable parts impeded.

Numerous other objects, advantages and novel details of construction of this invention will be made more apparent as this description proceeds, especially when considered in connection with the accompanying drawings wherein:

Figure 1 is a fragmentary elevational view of the frame, spring and axle of an automobile, with my invention associated therewith.

Figure 2 is an enlarged vertical sectional view through the shock absorber, and

Figure 3 is an enlarged fragmentary sectional view through a portion of the shock absorber showing my improved valve construction more in detail.

Referring now more particularly to the drawings wherein like reference characters indicate like parts and more especially to Figure 1, it will be noted that there is fragmentarily illustrated the side frame 10 of a motor vehicle and an axle 11 which is connected to the frame by means of a spring 12. The shock absorber comprises a casing 13 which is secured to the frame 10 by two or more lugs 14. Rockably journaled in the casing 13 is an arm 15 connected by a flexible element 16 to the axle 11.

The casing 13 presents a fluid chamber 17 and a cylinder 18, a piston 19 being reciprocably mounted in the latter. The arm 15 operates a cam 20 which engages piston 19 and upon movement of the arm 15 in one direction moves piston 19 downwardly, this being the working stroke of the piston. The piston is moved upwardly by means of a spring 21.

Cylinder 18 is provided with an inlet port 22 controlled by a valve 23 which opens freely on the upward movement of piston 19 and inasmuch as fluid chamber 17 contains fluid the cylinder 18 will be supplied with fluid upon the upstroke of the piston.

As the piston 19 starts on its downward stroke, valve 23 seats and the fluid in the cylinder is compelled to escape through port 24. In order to properly control the descent of the piston to thus cushion the movement between the two relatively movable parts 10 and 11 the escape of the fluid from the cylinder must be controlled under both normal and abnormal conditions.

For controlling the normal escape of fluid from the cylinder I provide a manually regulatable valve 25 herein shown as a needle valve having a tapered end 26 cooperating with outlet port 24 and an enlarged threaded shank portion 27 engageable with an internally threaded boss 28 formed in the wall of the casing 13. By providing the casing wall 13 with the extended boss portion 28 and by forming the valve member 25 with the extended enlarged shank portion 27 the tapered end 26 of this valve may be more accurately guided and positioned with reference to the aperture 24. After the valve 25 has been properly adjusted it may be locked in place by a lock nut 29.

While under ordinary conditions the restricted flow of fluid permitted through the port 24 will be sufficient it is often necessary to permit a greater flow of fluid from the cylinder to the fluid chamber, as for instance, when one of the movable parts is subjected to sudden or excessive shocks. In order to make provision for such conditions I propose forming the valve 25 with a longitudinally extending passageway or chamber 30 closed at one end and opening at the other end as at 31 for communication with the interior of the cylinder. Intermediate its length this chamber is provided with a plurality of laterally extending apertures or ports 32 which open on to the surface of the valve and surrounding these ports 32 I provide a chamber 33 defined by a pair of cupped disc-like members 34 formed preferably of spring metal and held normally in a position in which the peripheries engage. A convenient method of mounting the discs 34 and for assembling the same with the valve 25 consists in providing the valve with a reduced portion 35 thus forming a shoulder 36 against which one of the discs 34 may abut. A gasket or washer 37 may be interposed between this disc 34 and the shoulder 36. A washer or gasket 38 is placed against the other disc 34 and the valve 25 is provided with a shoulder which after the discs 34 have been assembled may be turned up to form a bead 39 bearing against washer 38. Thus the discs 34 are held in the position illustrated in Figure 3 and define the chamber 33 which surrounds the ports 32. Thus fluid will normally flow through chamber 30 and into chamber 33 but will not escape between the peripheries of the discs except when a sufficient pressure is obtained to overcome the inherent resiliency of these discs. Under such conditions the discs will be sprung apart and fluid will escape between the periphery of these discs. However, as soon as the pressure has fallen below an amount sufficient to force these discs apart they will again assume the position illustrated in Figure 3 whereupon the fluid can escape only through restricted port 24.

The herein described construction offers many advantages as the same may be quickly and economically manufactured, may be installed with facility and readily adjusted. The main valve 25 together with the discs 34 may be assembled apart from the remainder of the device and inserted as a unit through the apertured boss 28 in the casing 13. The valve 25 is capable of ready adjustment from the exterior of the device and the auxiliary valve associated therewith functions without adjustment or attention of any sort.

While an embodiment of the invention has been described and illustrated herein somewhat in detail it will be readily apparent to those skilled in this art that various changes in many of the essential and all of the nonessential details may be resorted to without departing from the spirit and scope of the invention and to this end reservation is made to make such changes as may come within the purview of the accompanying claims.

What I claim as my invention is:

1. A shock absorber for cushioning the movement of two relatively movable members comprising a casing adapted to be secured to one of said members and presenting a fluid chamber and a cylinder, a piston reciprocable in said cylinder, means connecting said piston to the other relatively movable member, means establishing a free flow of fluid from said fluid chamber to said cylinder in response to the movement of the piston in one direction and means for controlling the flow of fluid from the cylinder to the fluid chamber comprising a needle valve, a pair of dished discs mounted on said valve and providing a chamber therebetween, said valve being formed with a passage connecting said chamber with said cylinder whereby fluid will enter said chamber and upon attainment of excess pressure will spread said discs and flow into said fluid chamber.

2. A shock absorber for cushioning the movement of two relatively movable members comprising a casing adapted to be secured to one of said members and presenting a fluid chamber and a cylinder, a piston reciprocable in said cylinder, means connecting said piston to the other relatively movable member, means establishing a free flow of fluid from said fluid chamber to said cylinder in response to the movement of the piston in one direction and means for controlling the flow of fluid from the cylinder to the fluid chamber comprising a manually adjustable valve, controlling the normal flow of fluid, a pair of dished discs of spring metal mounted on said valve and peripherally engaging one another to form therebetween a chamber, said valve being provided with a passage connecting said chamber to the said cylinder, whereby fluid under sufficient pressure may escape between the peripheries of said discs.

3. In a device of the character described, the combination with a chamber containing fluid adapted to be placed under pressure and provided with a port, of means for controlling said port including a pair of resilient members provided with annular engaging portions, said members being adapted to separate under predetermined pressure to permit the discharge of said fluid.

4. In a device of the character described, the combination with a chamber containing fluid adapted to be placed under pressure and provided with a port, of means for controlling said port including a plurality of resilient members which together form a chamber having communication with said port, said members separating under predetermined pressure to permit discharge of said fluid.

5. In a device of the character described, the combination with a chamber containing fluid adapted to be placed under pressure and provided with a port, of means for controlling said port including a needle valve, a pair of dished disks mounted on said valve and providing a compartment therebetween, said valve being formed with a passage connecting said compartment with said chamber whereby fluid will enter said compartment and upon attainment of predetermined pressure will spread said disks and escape from said compartment.

6. In a device of the character described, the combination with a chamber containing fluid adapted to be placed under pressure and provided with a port, of means for controlling said port including a manually adjustable valve controlling normal flow of fluid through said port and means for controlling the additional flow of fluid through said port including a pair of resilient disks mounted on said valve and peripherally engaging one another to form therebetween a compartment, said valve being provided with a passage connecting said compartment to said chamber whereby fluid under sufficient pressure may escape between the peripheries of said disks.

7. In a device of the character described, the combination with a chamber containing fluid adapted to be placed under pressure and provided with a port, of means for controlling the said port including a pressure relief chamber formed of a plurality of resilient members, said relief chamber being connected to said first chamber whereby upon the attainment of a predetermined pressure therebetween said resilient members separate to permit the discharge of said fluid.

8. In a device of the character described, the combination with a chamber containing fluid adapted to be placed under pressure and provided with a port, of means for controlling said port including a relief chamber formed of resilient members engaging one another but separable by a pressure from within greater than the inherent resiliency thereof and means connecting said relief chamber to said chamber aforesaid, for the purpose set forth.

9. A shock absorber for cushioning the movement of two relatively movable members comprising a casing adapted to be secured to one of said members and presenting a fluid chamber and a cylinder, a piston reciprocable in said cylinder, means connecting said piston to the other relatively movable member, means establishing a free flow of fluid from said fluid chamber to said cylinder in response to the movement of the piston in one direction and means for controlling the flow of fluid from said cylinder to the fluid chamber including a relief chamber formed of a plurality of members, one of said members being inherently resilient, said members being separable by a pressure from within greater than the inherent resiliency of said member and means connecting said relief chamber to said chamber aforesaid.

In testimony whereof I affix my signature.

FRED P. BECKER.